INVENTORS
LAYTON D. MORGAN
ROBERT D. STRAIT

INVENTORS
LAYTON D. MORGAN
ROBERT D. STRAIT
BY
ATTORNEYS 3,192,525
RESISTIVE PHASE COMPENSATOR
Layton D. Morgan and Robert D. Strait, San Diego, Calif., assignors to the United States of America as represented by the Secretary of the Navy
Filed Oct. 15, 1962, Ser. No. 230,771
4 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

The present invention relates to a wave beam-steering system and more particularly to a beam-steering system utilizing matrix phase compensators and specifically, to a beam-steering system utilizing a matrix of resistive phase compensators.

In the prior art, electromagnetic and/or sound energy directivity has been accomplished by utilizing the beam forming characteristics of an antenna or hydrophone array and mechanically positioning the array to form a beam at a desired bearing. Another method also utilizes the beam forming arrays mentioned above but accomplishes beam steering by introducing in the various elements a predetermined phase or time delay for a given bearing of interest in conjunction with an omni-directional transmission. An additional method of accomplishing beam-steering is described in U.S. Patent No. 3,002,188 to Frank R. Abbott titled Harmonic Wave Beam-Steering System.

The disadvantages of the prior art methods utilizing the beam forming characteristics of an antenna hydrophone array and mechanically positioning the array and utilizing beam-steering by introducing predetermined phase or time delay are set forth in the aforementioned Patent No. 3,002,188.

Compared with the resistive phase compensator, the transformer phase compensator in production is more difficult and time consuming to fabricate and in addition there is a lower probability of correct wiring. Furthermore, it is more difficult to test for and correct production wiring errors and due to this is more costly to produce. Once the equipment is produced it is less maintainable and repairable in operational use and in operation is less compatible with transistor beam amplifiers. Further, the transformer phase compensator is less adaptable in the area of compact packaging and weight reduction.

The one advantage of the transformer phase compensator occurs at high power levels in forming beams for transmission when it is advantageous to use the transformer phase compensator over the present invention due to the dissipative losses in the resistive phase compensator which become important at high power levels.

However, the resistive phase compensator can also be used for transmission if the power levels are amplified or raised to the high level after the beams are formed.

An object of the present invention is to provide a multi-beam-steering network which is simple to fabricate, lending itself to automated production techniques, thereby requiring less time to fabricate and allowing a higher probability of correct wiring in production.

An additional object of the present invention is to provide a multi-beam-steering network which lends itself to rapid, simple test procedures during production.

A further object of the present invention is to provide a multi-beam-steering network which is low cost to produce and is easy to maintain and repair in operational use.

Another object of the present invention is to provide a multi beam-steering network which is compatible with transistor beam signal amplifiers, with a beam forming capability which is unaffected by the load resistance that usually will be the input resistance of the beam signal amplifier.

An additional object of the present invention is to provide a multi beam-steering network which lends itself to compact packaging and weight reduction by utilizing microminiature parts.

Various objects and advantages will appear from the following description of one embodiment of the invention, and the novel features will be particularly pointed out hereinafter in connection with the appended claims.

In order to better understand and explain the invention reference is made to the accompanying drawings wherein.

For the theory of operation of a transformer phase compensator and the formation of the beam steering network and the resultant operation of the same, reference is made to the aforementioned Patent No. 3,002,188 to Frank R. Abbott. The patent to Abbott explains in detail the formation of beams and the theory behind the use of phase compensation in order to obtain the scan of a hydrophone array without the mechanical movement of the array. The bearing of interest or the direction from which the sound is being received is determined by scanning. In the case of transmitting this would refer to the direction in which sound is being transmitted.

Figure 1:
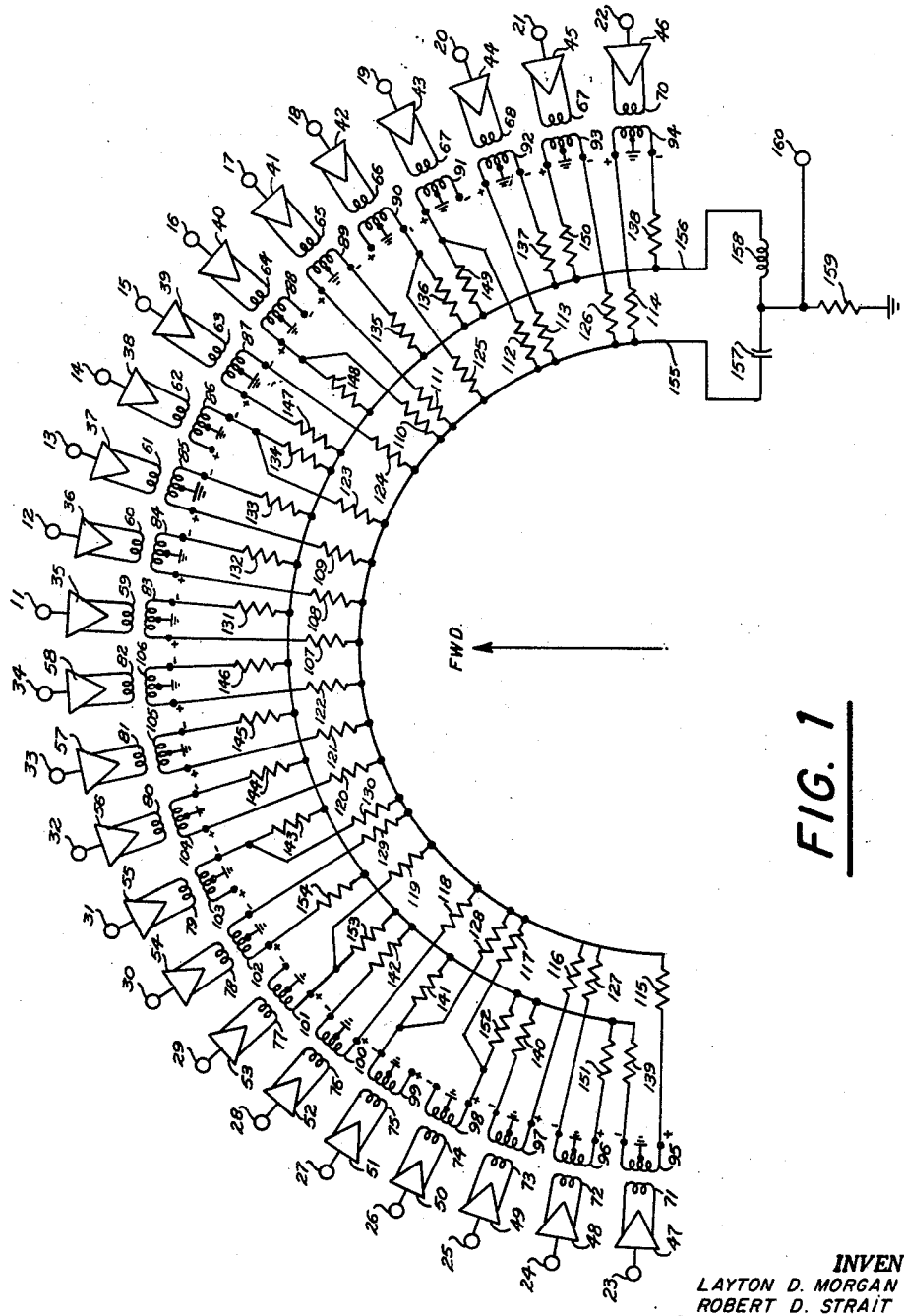
FIG. 1 is an illustrative schematic showing the formation of one beam relative to the portion of the hydrophone array used.

In the present invention, and with reference to FIG. 1 an embodiment is shown wherein a circular array is utilized of which 24 hydrophone staves of a transducer are coupled into the network to form a beam. The hydrophone elements comprise hydrophone staves 11 to 34. It is to be understood that these hydrophone elements 11–34 are merely individual staves in a circular hydrophone array. Each stave, or hydrophone element, may or may not be comprised of multiple sub-elements. The number of elements used to form a beam is determined from array theory and can be any portion or all of the total number in the array.

The individual hydrophone staves 11–34 are coupled to amplifiers 35–58 and then through primary windings 58–82 respectively of corresponding transformers. The amplified energy from the individual hydrophone staves 11–34 is coupled from the primaries 59–82 through transformer coupling to center tapped secondaries 83–106 respectively. The relative instantaneous polarity of the secondaries is as marked on FIG. 1 wherein a positive polarity is shown on the left hand side of the respective secondaries and a negative polarity on the right hand side of the respective secondaries. Connected to the left hand, i.e., positive, side of the secondaries 83, 84, 85, 88, 89, 91, 92, 94, 95, 97, 98, 100, 101, 104, 105, and 106 are cosine resistors 107–122 respectively. Connected to the right hand, i.e., negative, side of transformers secondaries 86, 87, 90, 93, 96, 99, 102, and 103 are respective cosine resistors 123, 124, 125, 126, 127, 128, 129 and 130.

Connected to the right hand side of transformer secondaries 83, 84, 85, 86, 89, 90, 92, 94, 95, 97, 99, 100, 103, 104, 105 and 106 are respective sine resistors 131–146. Connected to the left hand side of transformer secondaries 87, 88, 91, 93, 96, 98, 101, and 102 are respective sine resistors 147–154.

The respective cosine resistors are connected to a common cosine adding bus 155 while the respective sine resistors are connected to a common sine adding bus 156. Cosine bus 155 is connected to one side of a phase shift capacitor 157 while the sine bus 156 is connected to one side of a phase shift inductance 158. The other sides of capacitor 157 and inductance 158 are connected together and also connected to one side of load resistance 159, the other side of which is connected to ground. At the common point of capacitor 157 inductance 158 and load resistance 159 an output appears at terminal 160 which would be coupled to an amplifier stage, not shown. The load resistance normally will not be an individual resistor designated as such, but will be the input resistance of the following amplifier stage. For design test purposes a resistor may be desired to represent the input resistance of the following system amplifier, which may not be used.

The connections on the secondaries of various of the transformers such as 88 are as shown in that this is the means wherein the desired polarity is acquired, that is, on transformer secondary 88 it is desired that the cosine and sine functions both have a positive polarity. In contradistinction thereto, on secondary 99 it is desired that both sine and cosine functions have a negative polarity while on various others of the secondaries, such as that of secondary 100, it is desired that the sine function be negative and the cosine function positive.

The operation of the resistive phase compensator as set forth in FIG. 1 is the same as the operation of the harmonic wave beam-steering system in Patent #3,002,188 to Frank Abbott. The relative amplitude selecting function of the secondaries of the transformers of Abbott is taken over in the resistive phase compensator by the sine and cosine resistors connected to the secondaries 83–106.

In FIG. 1 there is illustrated the formation of one beam relative to the portion of the hydrophone array used. The beam is formed at 000° relative bearing with respect to the fore-aft axis of the ship on which the array is mounted i.e. directly head on. With respect to, for example, transducer stave 11 the resistance of resistor 131 is chosen such that the signal voltage $e_{11}$ from the hydrophone element 11 is attenuated to a value $e_{s11}$ which is proportional to $\sigma_{11} \sin \bar{\theta}_{o11} \cdot \sigma_{11}$ is the shading factor at the hydrophone element 11 and $\bar{\theta}_{o11}$ the phase at the hydrophone element 11 referred to a reference point for sound arriving from the direction of compensation. The subscript $o$ indicates a circular array.

The same result would be desired for the $e_{11}$ voltage at the left hand side of the transformer secondary 83 wherein the resistor 107 would attenuate the signal voltage $e_{11}$ to a value $e_{c11}$ from the hydrophone element 11 which is proportional to $\sigma_{11} \cos \bar{\theta}_{o11}$. The individual attenuating resistors attenuate their signals into a common load that consists of the parallel combination of all the other individual resistors, and their generators and the other beam networks to which these generators contribute, and the 90° phase shift and final summation networks comprising the capacitor 157, inductor 158 and load resistor 159. Identical transformers are used with center-tapped secondaries: center-tapped to allow the selection of the proper instantaneous polarity corresponding to the proper algebraic sign for that signal.

The individual cosine voltages are summed on the common additive bus 155; the sine voltages are summed on the additive summing bus 156. In the present instance the voltage component corresponding to the cosine summation would be an $\overline{X}$ component, and the voltage component corresponding to the sine component would be the Y component. Vector rotation $(-jY)$ is performed with the phase shift network. Either the sine component Y can be rotated $-90°$; or the cosine component $\overline{X}$ can be rotated $+45°$ and the sine component Y rotated $-45°$; or any other consistent desired combination can be used as long as the relative phase shift is 90°, providing that the relationship of the phase of the formed beam voltage with respect to the phase at any of the inputs is not of any importance. In FIG. 1 the cosine component $\overline{X}$ is rotated $+45°$ by the effective reactance of the combination of capacitor 157 and load resistance 159. The sine component Y is rotated $-45°$ by the effective reactance of the combination of inductor 158 and load resistance 159. The result of shifting each component by $\pm 45°$ in opposite directions, is a relative shift of the sine component Y, with respect to the cosine component X, of 90° so that the resultant $R = \overline{X} - jY$ is formed across load resistor 159.

Thus, the resistive phase compensator performs four operations on a signal in the following way. Each hydrophone's signal is applied to a resistor voltage divider and attenuated to a value proportional to cosine $\bar{\theta}_{oi}$, where $\bar{\theta}_{oi}$ equals the phase at a particular stave, relative to a reference point, of signals from the direction of compensation. Subscript "O" denotes a circular array and subscript "i" represents the number of the particular hydrophone stave being considered. This signal is summed with all other signals which have multiplied by their respective cosine $\bar{\theta}_{oi}$'s and all of the voltage dividers are designed to use a common load, which for any one divider includes also the parallel load of the other dividing resistors.

At the same time, each hydrophone signal is applied to a resistor voltage divider where it is attenuated to an amount proportional to sine $\bar{\theta}_{oi}$. As in the step relating to the cosine voltages the sine signals are summed across a common load.

Vector rotation, $-jY$, is then performed in an LC network which is also simultaneously a part of all the sine and cosine voltage dividers loads. It is to be understood that other types of 90° phase shift networks could be used.

Finally, the two resultant vectors $\overline{X}$ and $-jY$ are summed across a resistive load. In a sonar system for example, this would be the input resistance of the amplifier for that particular beam.

It is to be understood that FIG. 1 represents the formation of only one beam and that any number of beams at any particular bearings of interest could be formed and utilized depending upon the particular equipments involved. Thus, in order to form more than one beam it is necessary to have other corresponding sine and cosin attenuating resistors in the network.

This would correspond to an arrangement such as that set forth in FIG. 1 of Patent #3,002,188 where four separate beams are shown as being formed and in FIG. 5 wherein twelve directions of interest are examined.

The phase compensator basically simply shifts the phases of the signals from various elements of an array of hydrophones so that they add in-phase electrically for acoustic or electromagnetic signals from particular directions. This principle is used to provide a simple, reliable, and compact package which will give multiple preformed sonar beams. However, it may be advantageous to utilize this concept in a variety of other phase shifting applications.

The technique can provide the formation of single or multiple phased outputs from single or multiple phased inputs wherever lumped or determinable constant circuit elements can be used and where circuit restrictions are acceptable. This is applicable with the use of transformer or resistor or capacitor circuit elements.

A phase compensator is designed to provide receiving beams from an array of elements by phasing and summing the individual element voltages; the process is reversible: and by introducing a voltage signal into any beam output a resulting group of voltages of various phases will appear at the normal inputs to the phase compensator. It is in this manner that some transformer phase compensators have been designed and constructed specifically to form transmitting beams for sonar arrays. If, in the receiving array above, two or more voltage signals of the same or different phases were applied to the inputs of two or more beams having array elements in common, the resulting group of voltages appearing at the normal inputs to the phase compensator would have different phases and amplitudes than with only one beam input. Of course, the specific values would depend upon the design values of the phase compensator, as well as the amplitudes and relative phases of the voltages introduced into the beam outputs. Obviously, almost any combination in number of input output voltages for a variety of circuit applications may be obtained in this general way.

Another manner of doing this is by considering one or more signal inputs as analogous to the array element inputs to the phase compensator, when it is used to "form" receiving beams. The desired phased outputs would then be considered analogous to the "beam" outputs, and an almost limitless number of different combinations of input output voltages and phases may be obtained i.e., 2 phase to 4 phase; 2 phase to 3 phase; 1 phase to 6 phase, etc.

Figure 2:
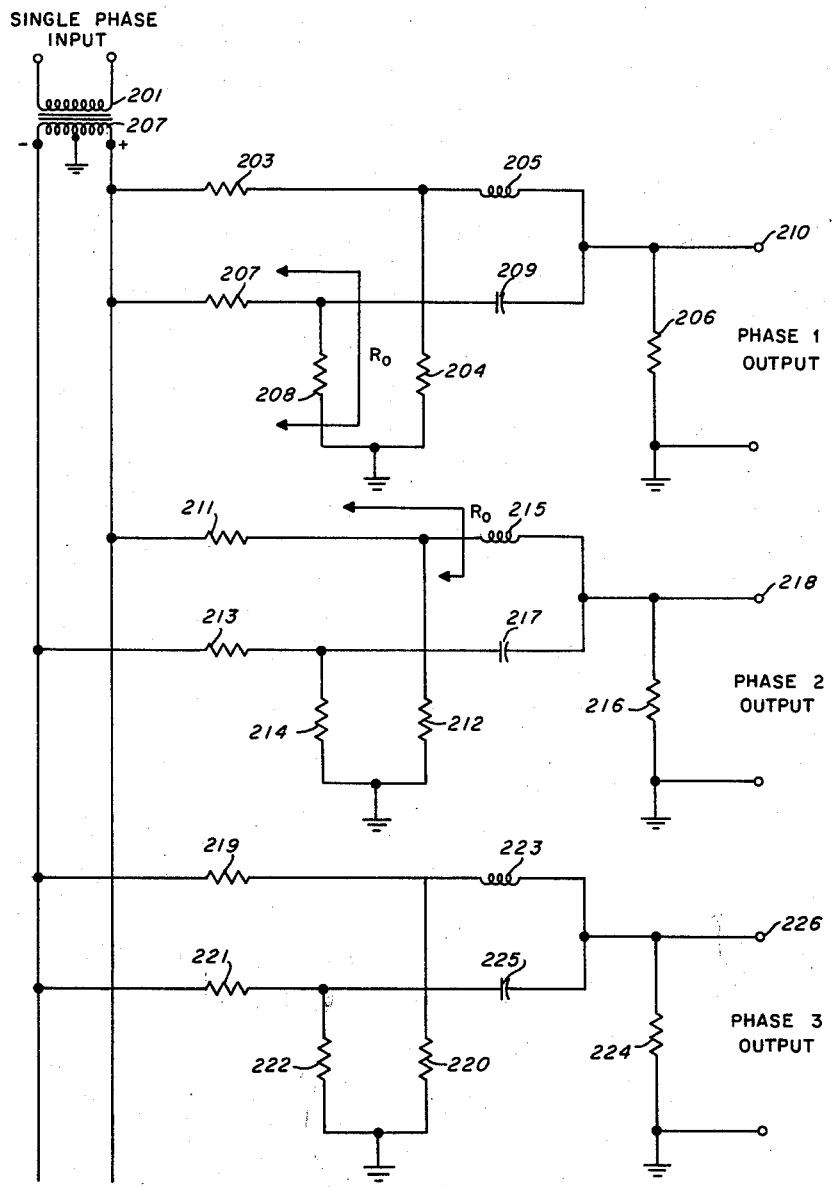
FIG. 2 is an illustration of a one to three phase network using resistor elements.

FIG. 2 illustrates the general circuit configuration to obtain 3 phase voltages from a single phase input. This is analogous to a phase compensator for a one-element "array" forming three "beams" for predetermined angles of compensation. There is only one signal input to "sum" its voltage on the sine and cosine beam buses in the resistive phase compensator, so an additional shunt resistor to ground, is necessary to allow the LC 90° phase shift network to look "back" into the $R_0$ impedance that will not in general be the same as that of each attenuating resistor used. By using a different 90° phase network, or modifying the original circuit constants these shunt resistors might be eliminated.

Thus, in FIG. 2 there is shown a primary winding 201 to which a single phase input would be coupled and and a secondary winding 202 center-tapped to ground and having polarities of plus and minus on the right and left hand sides respectively as shown. Connected to the positive side of secondary 202 is a sine attenuating resistor 203 the other side of which is connected through a resistor 204 to ground. The common point of resistor 203 and 204 is connected to one side of phase shift inductance 205 and the other side of inductance 205 is connected to one side of load resistor 206 the other side of which is connected to ground. The same side i.e. positive side of secondary 202 is connected to one side of a resistor 207 which corresponds to the cosine attenuating resistor and then through resistor 208 to ground. The comon point of resistor 207 and 208 is connected to one side of phase shift capacitor 209 the other side of which is connected to the common point of inductance 205 and resistor 206. The phase-one output is taken across load resistor 206 between terminal 210 and ground.

The phase-two combination comprises a resistor 211 connected to the positive side of transformer secondary 202 corresponding to the sine attenuating resistor. Resistor 211 is connected through resistor 212 to ground. Cosine resistor 213 is connected to the negative side of transformer secondary 202 and through a resistor 214 to ground. The common point of resistors 211 and 212 is connected to one side of phase shift inductance 215 the other side of which is connected through load resistor 216 to ground. The common point of resistors 213 and 214 is connected to one side of phase shift capacitor 217 the other side of which is also connected through load resistor 216 to ground. The phase two output is taken across load resistor 216 between terminal 218 and ground.

The phase-three combination comprises sine attenuating resistor 219 connected to the negative side of transformer secondary 202. Resistor 219 is then connected through resistor 220 to ground. The cosine attenuating resistor 221 is also connected to the negative side of transformer secondary 202 and through resistor 222 to ground. The common side of resistors 219 and 220 is connected to one side of phase shift inductance 223 the other side of which is connected through load resistor 224 to ground. The common point of resistors 221 and 222 is connected to one side of phase shift capacitor 225 the other side of which is also connected through load resistor 224 to ground. The phase-three output is taken across load resistor 224 between point 226 and ground.

The phase-one, phase-two and phase-three outputs could be used, for example, to provide the deflection voltages for a PPI display tube by interposing suitable amplifier stages.

Other applications of the invention other than those disclosed might be had i.e., a transistor phase inverter could replace the transformer input to the resistor matrix and other types of quadrature phase shift networks could be used in place of the LC type described. It is to be understood that the word resistor specifically includes any resistive circuit element regardless of the physical form i.e., microminiature deposits on substrates are included when the deposits act as electrical resistors.

It will be understood that various changes in the details, materials, steps and arrangements of parts, which have been herein described and illustrated in order to explain the nature of the invention, may be made by those skilled in the art within the principle and scope of the invention as expressed in the dependent claims.

What is claimed is:

1. A multi-beam energy sensing and transmitting system comprising;
    (a) a plurality of energy sensing elements adapted for sensing energy of a given frequency, said sensing elements spatially disposed for sensing energy from a given direction;
    (b) a plurality of pairs of reactive coupling means, each of said pairs coupling energy from a respective one of said sensing means;
    (c) cosine coupling elements coupled to each of said pairs of reactive coupling means;
    (d) sine coupling elements operatively coupled to each of said pairs of reactive coupling means;
    (e) said sine and cosine coupling elements comprising substantially pure resistance at the given frequency;
    (f) said sine and cosine coupling elements coupling signals of an amplitude directly proportional to the sine and cosine functions of an angle of phase displacement of sensed energy resulting from a source angularly displaced from a given reference direction;
    (g) the number of pairs of said reactive coupling means connected to each sensing means being equal to the number of source directions of interest;
    (h) all of said sine coupling elements corresponding to each of said directions of interest being connected in additive relationship forming a sine channel for each direction of interest;
    (i) all of said cosine coupling elements corresponding to each of said directions of interest connected in additive relationship thereby forming a cosine channel for each direction of interest;
    (j) means for shifting each sine channel and cosine channel for each direction of interest 90° relative to one another;
    (k) the shifted outputs of all sine coupling elements and cosine coupling elements being connected in an additive relationship.

2. A multi-beam energy sensing and transmitting system comprising;
    (a) a plurality of energy sensing and transmitting elements for sensing and transmitting energy of a given frequency;
    (b) said elements being spatially disposed for sensing and transmitting said energy from and to a given direction substantially in phase;
    (c) a plurality of transformers each having a primary winding and a secondary winding; one each of said primary windings being connected to the output of a corresponding one of said elements;
    (d) sine and cosine resistance means operatively coupled to said secondary windings;
    (e) said sine and cosine resistive means having a value proportional to the sine and cosine respectively of the angle of phase displacement of said sensed energy relative to the phase of energy induced in a predetermined reference element resulting from a source angularly displaced from a given direction;
(f) the number of pairs of said sine and cosine resistive elements being equal to the number of source directions of interest;
(g) all of said sine resistive elements corresponding to each of said directions of interest being connected in additive relationship forming a sine channel;
(h) all of said cosine resistive elements corresponding to each of said directions of interest being connected in additive relationship forming a cosine channel;
(i) phase shifting means for shifting said sine channel and cosine channel 90° relative to one another;
(j) means connecting said shifted sine channel and cosine channel in additive relationship.

3. A resistive multi-beam phase compensating system comprising;
a plurality of energy sensing elements adapted for sensing energy of a given frequency and spatially disposed for each sensing energy from a given direction;
a plurality of transformer means each having a primary and a center-tapped secondary winding, said primary windings being operatively coupled to respective ones of said sensing elements to receive sensed energy from same;
a plurality of sine resistors each having one of its terminals connected to a respective one of said plurality of transformer secondaries and the other of its terminals to a common sine bus means;
said sine resistors each having a value proportional to the sine of the phase angle of the sensed energy received by its respective sensing element;
a plurality of cosine resistors each having one of its terminals connected to a respective one of said plurality of transformer secondaries and the other of its terminals to a common cosine bus means;
said cosine resistors each having a value proportional to the cosine of the phase angle of the sensed energy received by its respective sensing element;
said plurality of sine resistors and said plurality of cosine resistors each being equal in number to said plurality of sensing elements and said plurality of transformer means;
phase shifting means operatively coupled to said sine and cosine bus means to introduce a shift of 90° to a signal on one of said busses relative to signals on the other of said busses;
summing means for combining the shifted signals of one bus with those of the other bus.

4. The system of claim 3 wherein said energy sensing elements are acoustical transducers.

References Cited by the Examiner
UNITED STATES PATENTS

| | | | |
|---|---|---|---|
| 2,567,862 | 9/51 | Van Voorhis | 343—6 |
| 2,703,396 | 3/55 | Rich | 340—6 |
| 3,002,188 | 9/61 | Abbott | 343—100 |

CHESTER L. JUSTUS, *Primary Examiner*.